US012634165B2

(12) United States Patent
Kong

(10) Patent No.: US 12,634,165 B2
(45) Date of Patent: May 19, 2026

(54) NETWORK CONFIGURATION TERMINAL, NETWORK CONFIGURATION METHOD FOR HOME APPLIANCE, AND COMPUTER-READABLE STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventor: Shumiao Kong, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 826 days.

(21) Appl. No.: 17/777,882

(22) PCT Filed: Jul. 28, 2020

(86) PCT No.: PCT/CN2020/105232
§ 371 (c)(1),
(2) Date: May 18, 2022

(87) PCT Pub. No.: WO2021/103619
PCT Pub. Date: Jun. 3, 2021

(65) Prior Publication Data
US 2022/0417052 A1    Dec. 29, 2022

(30) Foreign Application Priority Data
Nov. 28, 2019    (CN) .......................... 201911212306.2

(51) Int. Cl.
*H04L 12/28*        (2006.01)
*H04W 84/12*        (2009.01)

(52) U.S. Cl.
CPC ......... *H04L 12/2807* (2013.01); *H04W 84/12* (2013.01)

(58) Field of Classification Search
CPC ..... H04L 12/2807; H04L 41/12; H04L 61/50; H04L 12/2809; H04L 12/281;
(Continued)

(56) References Cited

U.S. PATENT DOCUMENTS

2014/0310404 A1 * 10/2014 Etchegoyen ........ H04L 12/2809
709/224
2014/0359675 A1 * 12/2014 Mank .................. H04L 12/2809
725/80
(Continued)

FOREIGN PATENT DOCUMENTS

| CN | 104375497 A | 2/2015 |
| CN | 107171903 A | 9/2017 |
(Continued)

OTHER PUBLICATIONS

World Intellectual Property Organization (WIPO) International Search Report and Written Opinion for PCT/CN2020/105232 Oct. 21, 2020 14 Pages (with translation).
(Continued)

*Primary Examiner* — Jeffrey M Rutkowski
(74) *Attorney, Agent, or Firm* — Anova Law Group, PLLC

(57) ABSTRACT
A home appliance network configuration method includes sending, by a network configuration terminal, a generation instruction of generating an initial code to a target home appliance, and acquiring, based on the generation instruction, the initial code generated by the target home appliance, for a control terminal to communicate with a WIFI module of the target home appliance based on the initial code.

6 Claims, 2 Drawing Sheets

The target home appliance meeting a preset condition, acquiring a preset code — S12

Establishing a communication with the WIFI module in the target home appliance according to the preset code — S13

Sending the generation instruction of generating the initial code to the target home appliance — S14

(58) Field of Classification Search
CPC ............. H04L 12/2812; H04L 12/2814; H04L 12/2805; H04L 12/2803; H04W 84/12; H04W 88/18; H04W 92/14; H04W 84/02; H04W 84/10
See application file for complete search history.

(56) References Cited

U.S. PATENT DOCUMENTS

| | | | | |
|---|---|---|---|---|
| 2014/0362991 | A1* | 12/2014 | Ebrom | H04W 12/04 |
| 2016/0094360 | A1* | 3/2016 | Engelhardt | H04L 12/2807 |
| | | | | 709/220 |
| 2016/0373270 | A1* | 12/2016 | Yang | H04L 12/2807 |
| 2016/0373914 | A1* | 12/2016 | Lee et al. | H04W 8/005 |
| 2016/0381631 | A1* | 12/2016 | Cholas et al. | H04W 48/20 |
| 2017/0212487 | A1* | 7/2017 | Gupta | H04L 12/2807 |
| 2017/0289901 | A1* | 10/2017 | Kim | H04W 48/16 |
| 2018/0359095 | A1* | 12/2018 | Asati | H04L 12/281 |
| 2019/0246346 | A1* | 8/2019 | Huang et al. | H04W 48/18 |
| 2019/0281118 | A1* | 9/2019 | Kim | H04L 12/2807 |
| 2019/0320317 | A1* | 10/2019 | Sakai et al. | H04W 48/20 |
| 2019/0342159 | A1 | 11/2019 | Witko | |
| 2020/0322177 | A1* | 10/2020 | Kim | H04L 12/2803 |
| 2025/0298455 | A1* | 9/2025 | Young | H04L 12/2807 |

FOREIGN PATENT DOCUMENTS

| | | | | |
|---|---|---|---|---|
| CN | 108111375 A | 6/2018 | | |
| CN | 108135022 A | 6/2018 | | |
| CN | 108282358 A | 7/2018 | | |
| CN | 110365704 A | 10/2019 | | |
| CN | 110995552 A | 4/2020 | | |
| EP | 3484196 A1 * | 5/2019 | ............ | H04W 60/04 |

OTHER PUBLICATIONS

The China National Intellectual Property Administration (CNIPA) The First Office Action for Chinese Application 201911212306.2 Mar. 2, 2021 16 Pages (With Translation).
The European Patent Office (EPO) Extended Search Report for EP Application No. 20892126.2 Jan. 11, 2023 8 Pages.

* cited by examiner

The target home appliance meeting a preset condition, acquiring a preset code — S12

Establishing a communication with the WIFI module in the target home appliance according to the preset code — S13

Sending the generation instruction of generating the initial code to the target home appliance — S14

NETWORK CONFIGURATION TERMINAL, NETWORK CONFIGURATION METHOD FOR HOME APPLIANCE, AND COMPUTER-READABLE STORAGE MEDIUM

This application is a National Stage Entry under 35 U.S.C. § 371 of International Application No. PCT/CN2020/105232, filed on Jul. 28, 2020, which claims priority to Chinese Patent Application No. 201911212306.2, filed on Nov. 28, 2019 and entitled "NETWORK CONFIGURATION TERMINAL, NETWORK CONFIGURATION METHOD FOR HOME APPLIANCE, AND COMPUTER-READABLE STORAGE MEDIUM," the entire contents of both of which are incorporated herein by reference.

TECHNICAL FIELD

This application relates to the technical field of network configuration for home appliances, in particular to a network configuration terminal, a network configuration method for a home appliance and a computer-readable storage medium.

BACKGROUND

With the improvement of living level of people, there are more and more home appliances in home.

The user can control a home appliance through a control terminal. At present, home appliances of the same model can be controlled through a same control terminal, for example, two adjacent houses have air conditioners of a same model, a user of Family A can control the air conditioner of Family B through a remote controller. This control mode may let the home appliance receive a malicious control instruction and damage the home appliance.

SUMMARY

The main purpose of this application is to provide a network configuration terminal, a network configuration method for a home appliance and a computer-readable storage medium, aiming to solve the problem that the home appliance is damaged resulting from receiving malicious control instructions.

In order to achieve the above purpose, the present application provides a home appliance configuration method applied to a network configuration terminal, the network configuration method for the home appliance comprises:

sending, by the network configuration terminal, a generation instruction of generating an initial code to a target home appliance; and acquiring, based on the generation instruction, the initial code generated by the target home appliance, for a control terminal to communicate with a WIFI module of the target home appliance based on the initial code.

In one embodiment, the network configuration terminal and the control terminal are the same terminal, or the network configuration terminal and the control terminal are different terminals.

In one embodiment, the network configuration terminal and the control terminal are the same terminal, the network configuration terminal is provided with a first application program and a second application program, the network configuration terminal obtains the initial code of the target home appliance through the first application program, and causes the second application program to control the target home appliance based on the initial code.

In one embodiment, the network configuration terminal and the control terminal are different terminals, after the acquiring, based on the generation instruction, the initial code generated by the target home appliance, the method further comprises:

sending the initial code to the control terminal for the control terminal to communicate with the target home appliance based on the initial code.

In an embodiment, before the sending the generation instruction of generating the initial code to the target home appliance, the method further comprises:

the target home appliance meeting a preset condition, and executing the sending the generation instruction of generating the initial code to the target home appliance.

In an embodiment, after the target home appliance meeting a preset condition, the method further comprises:

acquiring a preset code, and establishing a communication with the WIFI module of the target home appliance according to the preset code;

executing the sending the generation instruction of generating the initial code to the target home appliance.

In one embodiment, the preset condition comprises:

the WIFI module of the target home appliance having been changed; or a circuit board of the target home appliance which contains the WIFI module having been changed.

In one embodiment, the WIFI module of the target home appliance is at least provided with a first communication protocol and a second communication protocol, the WIFI module is connected with the network configuration terminal through the first communication protocol, and connected with the control terminal through the second communication protocol.

In order to achieve the above object, the present application further provides a computer-readable storage medium, the computer-readable storage medium stores a network configuration program for a home appliance, when the network configuration program for the home appliance is executed by the processor, various steps of the network configuration method for the home appliance as described above are implemented.

According to the network configuration terminal and the network configuration method for the home appliance and the computer storage medium provided in the present application, the network configuration terminal sends a generation instruction of generating an initial code to the target home appliance, and obtains, based on the generation instruction, the initial code generated by the target home appliance, so that the control terminal is communicated with the WIFI module of the target home appliance according to the initial code. Since the home appliance is communicated with the control terminal through the initial code, that is, each control terminal performs legitimate control on the home appliance through the corresponding initial code, the home appliance does not receive the control instruction sent by other terminals, thereby avoiding receiving a malicious control instruction sent by other terminals, and ensuring the security of the home appliance.

The realization of the objectives, functional features and advantages of the present application will be further explained with reference to the accompanying drawings in combination with the embodiment.

DETAILED DESCRIPTION OF THE EMBODIMENTS

It should be understood that the specific embodiments described herein are only used to explain the present application, and are not intended to limit the present application.

The main solution of the embodiments of the present application is as follows: a network configuration terminal sends a generation instruction of generating an initial code to a target home appliance, and obtains, based on the generation instruction, the initial code generated by the target home appliance, so that a control terminal communicates with a WIFI module of the target home appliance based on the initial code.

Since the home appliance communicates with the control terminal based on the initial code, that is, each control terminal performs legitimate control on the home appliance according to the corresponding initial code, the home appliance will not receive a control instruction sent by other terminals, which avoids receiving a malicious control instruction sent by the other terminals, and ensuring the security of the home appliance.

Figure 1:
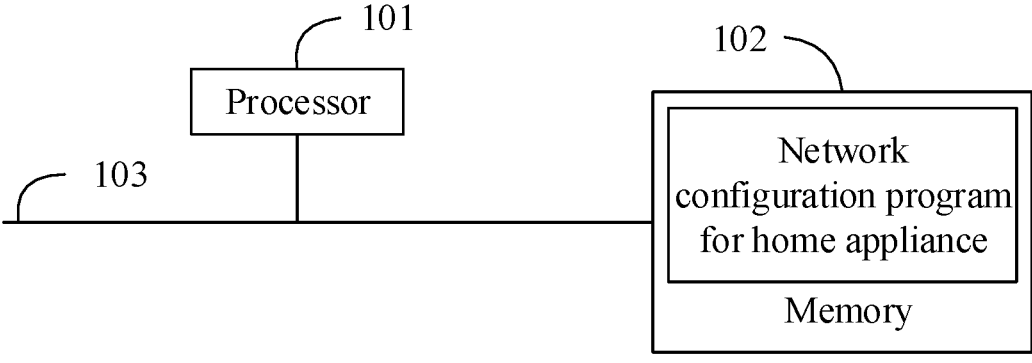
FIG. 1 is a schematic diagram of hardware structures of a network configuration terminal according to an embodiment of the present application.

As an implementation, the network configuration terminal may be as shown in FIG. 1.

The embodiments of the present application relate to a network configuration terminal, and the network configuration terminal includes a processor 101, such as a CPU, a memory 102, and a communication bus 103. The communication bus 103 is used for implementing connection and communication between these components.

The memory 102 may be a high-speed RAM memory or a non-volatile memory, such as a magnetic disk memory. As shown in FIG. 1, the memory 103, as a computer storage medium, may include a network configuration program for the home appliance, and the processor 101 may be configured to invoke the network configuration program for the home appliance stored in the memory 102, and perform following operations:

sending, by the network configuration terminal, a generation instruction of generating an initial code to a target home appliance;

acquiring, based on the generation instruction, the initial code generated by target home appliance, thereby a control terminal communicates with a WIFI module of the target home appliance based on the initial code.

In one embodiment, the processor 101 may be configured to invoke the network configuration program for the home appliance stored in the memory 102, and perform following operations:

the network configuration terminal and the control terminal being the same terminal or different terminals.

In one embodiment, the processor 101 may be configured to invoke the network configuration program for the home appliance stored in the memory 102, and perform following operations:

the network configuration terminal and the control terminal being the same terminal, providing the network configuration terminal with a first application program and a second application program, acquiring, by the network configuration terminal, the initial code of the target home appliance through the first application program, and causing the second application program to control the target home appliance based on the initial code.

In one embodiment, the processor 101 may be configured to invoke the network configuration program for the home appliance stored in the memory 102, and perform following operations:

sending the initial code to the control terminal for the control terminal to communicate with the target home appliance based on the initial code.

In one embodiment, the processor 101 may be configured to invoke the network configuration program for the home appliance stored in the memory 102, and perform following operations:

the target home appliance meeting a preset condition, and executing the operation of sending the generation instruction of generating the initial code to the target home appliance.

In one embodiment, the processor 101 may be configured to invoke the network configuration program for the home appliance stored in the memory 102, and perform following operations:

acquiring a preset code, and establishing a communication with the WIFI module of the target home appliance according to the preset code;

executing the operation of sending the generation instruction of generating the initial code to the target home appliance.

In one embodiment, the processor 101 may be configured to invoke the network configuration program for the home appliance stored in the memory 102, and perform following operations:

the WIFI module of the target home appliance being changed; or a circuit board containing the WIFI module of the target home appliance being changed.

In one embodiment, the processor 101 may be configured to invoke the network configuration program for the home appliance stored in the memory 102, and perform following operations:

providing the WIFI module of the target horde appliance with at least a first communication protocol and a second communication protocol, connecting the WIFI module with the network configuration terminal through the first communication protocol, and connecting the WIFI module with the control terminal through the second communication protocol.

According to the solution, the network configuration terminal sends a generation instruction of generating an initial code to the target home appliance, and obtains, based on the generation instruction, the initial code generated by the target home appliance, so that the control terminal communicates with the WIFI module of the target home appliance according to the initial code. Since the home appliance communicates with the control terminal through the initial code, that is, each control terminal performs legitimate control on the home appliance through the corresponding initial code, the home appliance will not receive the control instruction sent by other terminals, which avoids receiving a malicious control instruction sent by the other terminals, and ensures the security of the home appliance.

Based on the hardware structures of the network configuration terminal, the embodiments of a network configuration method for a home appliance is provided.

Figure 2:
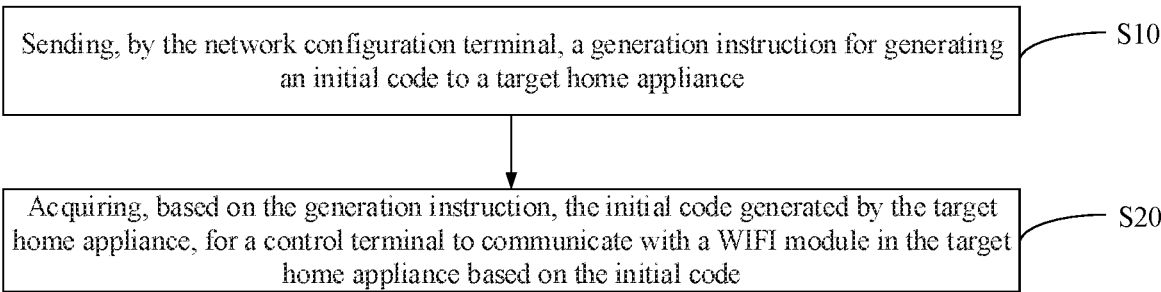
FIG. 2 is a schematic flowchart of a first embodiment of a network configuration method for a home appliance according to the present application.

Referring to FIG. 2, FIG. 2 is a first embodiment of the network configuration method for the home appliance of the present application, and the network configuration method for the home appliance includes following operations:

operation S10, sending, by a network configuration terminal, a generation instruction of generating an initial code to a target home appliance.

In this embodiment, the executive body is a network configuration terminal. The home appliance may be controlled by a control terminal, and the control terminal may be loaded with a control program. The control terminal communicates with the WIFI module of the home appliance, so that the control program sends control instructions to the home appliance to achieve the purpose of controlling the home appliance. The home appliance can be an air conditioner, a television, a washing machine or the like.

It should be noted that the WIFI module is provided with a communication protocol corresponding to the program, and the initial code is set for the communication protocol, the initial code is relatively complex and not easy to be cracked. The control terminal is connected with the WIFI module through the initial code, so that the control terminal sends a control instruction to the home appliance through the communication protocol.

The home appliance can be provided with a component for generating the initial code for the WIFI module, and the component can randomly generate the initial code after receiving the generation instruction of generating the initial code. Of course, the initial code can also be generated by WIFI module itself. The network configuration terminal is communicated with the WIFI module of the home appliance, that is, the WIFI module is provided with a communication protocol corresponding to the network configuration terminal, and the network configuration terminal communicates with the WIFI module through the communication protocol. It can be understood that the WIFI module of the target home appliance is provided with at least a first communication protocol and a second communication protocol, the WIFI module is communicated with the network configuration terminal through the first communication protocol, and communicated with the control terminal through the second communication protocol.

When the control terminal is to control the home appliance, the control terminal needs to acquire the initial code generated by the WIFI module, so that the control terminal communicates with the WIFI module of the home appliance through the initial code. Therefore, when the configuration terminal detects that the control terminal needs to control the home appliance, and the control terminal does not receive response information from the home appliance based on a control instruction sent by the control terminal, the initial code corresponding to the WIFI module of the home appliance can be determined to be changed, thus the control terminal cannot control the home appliance. It can be understood that when the control terminal sends a control instruction to the target home appliance, and the response information fed back by the target home appliance is not received, the control terminal can send a message that the target home appliance does not respond to the network configuration terminal. The network configuration terminal sends a generation instruction of generating the initial code to the target home appliance through the communication protocol which is set in the WIFI module of the target home appliance for communicating with the network configuration terminal, so that the WIFI module of the target home appliance generates the initial code again.

Operation S20, acquiring, based on the generation instruction, the initial code generated by the target home appliance, thereby the control terminal is communicated with a WIFI module of the target home appliance based on the initial code.

After generating the initial code, the WIFI module can display the initial code on a display screen of the target home appliance, so that the network configuration terminal obtains the initial code. Of course, the target home appliance can directly send the initial code to the network configuration terminal, and the target home appliance sends its own device identifier together to the network configuration terminal when sending the initial code to the network configuration terminal, so that the network configuration terminal knows the control terminal corresponding to the initial code according to the device identifier. In addition, after the target home appliance generates the initial code, the target home appliance can encode the initial code, and send the encoded initial code to the network configuration terminal. A decoding program corresponding to the coding program in the home appliance is arranged in the network configuration terminal, and the initial code can be restored through the decoding program. After the network configuration terminal obtains the initial code, the control terminal can communicate with the WIFI module of the target home appliance according to the initial code, so that the user can control the target home appliance through the control terminal.

In the technical solution provided by this embodiment, the network configuration terminal sends a generation instruction of generating an initial code to the target home appliance, and obtains an initial code generated by the target home appliance based on the generation instruction, so that the control terminal communicates with the WIFI module of the target home appliance according to the initial code. Since the home appliance is communicated with the control terminal according to the initial code, that is, each control terminal performs legitimate control on the home appliance according to a corresponding initial code, the home appliance will not receive control instructions sent by other terminals, avoiding that the malicious control instructions sent by other terminals are received, and ensuring the security of the home appliance.

In one embodiment, the network configuration terminal and the control terminal can be the same terminal or different terminals. When the network configuration terminal and the control terminal are different terminals, after acquiring the initial code, the network configuration terminal sends the initial code to the control terminal, so that the control terminal communicates with the WIFI module of the target home appliance according to the initial code.

When the network configuration terminal and the control terminal are the same terminal, the network configuration terminal can be provided with a first application program and a second application program. The first application program sends the generation instruction of generating the initial code to the WIFI module of the target home appliance through the network configuration terminal, and obtains the initial code generated by the WIFI module. The second application program acquires the initial code acquired by the first application program, so that the second application program can send a control instruction to the target home appliance according to the initial code. That is, the first application program obtains the initial code generated by the WIFI module through the first communication protocol, and the second application program sends the control instructions to the target home appliance through the second communication protocol. The first application program can be a network configuration program, and the second application program can be a control program. For example, the network configuration program can be the MSmart APP, and the control program can be the home APP.

After obtaining the initial code, the first application program can generate and output prompt information, so that the user obtains the initial code according to the prompt information, and opens the second application program of the network configuration terminal, thereby the initial code is input in the second application program, and the second application program can communicate with the WIFI module of the target home appliance through the network configuration terminal. In addition, the terminal can automatically switch between the first application program and the second application program. Specifically, when the control instruction is sent to the target home appliance by the second application program, but the target home appliance does not feed back the response information, or the network configuration terminal with the second application program installed cannot establish the communication with the WIFI module of the target home appliance, the second application program sends information to the processor of the network configuration terminal about that the WIFI module of the target home application is faulty, the processor automatically runs the first application program, so that the first application program sends the generation instruction of generating the initial code to the target home appliance. After the first application program obtains the initial code, the first application program sends information to the processor that the initial code is acquired, so that the processor switches from the first application program to the second application program, and sends the initial code to the second application program. Therefore, the second application program can send information to the WIFI module according to the initial code.

Figure 3:
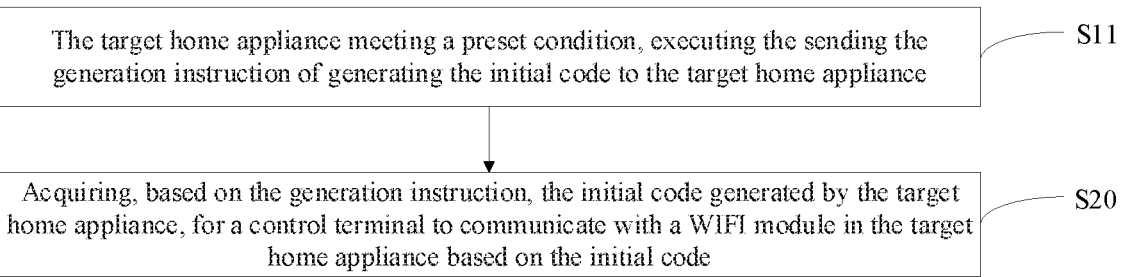
FIG. 3 is a schematic flowchart of the network configuration method for the home appliance according to a second embodiment of the present application.

Referring to FIG. 3, FIG. 3 is a second embodiment of the network configuration method for the home appliance of the present application. Based on the first embodiment, operation S10 includes:

operation S11, the target home appliance meeting a preset condition, and sending a generation instruction of generating the initial code to the target home appliance.

In this embodiment, when the network configuration terminal detects that the target home appliance meets a preset condition, the network configuration terminal sends the generation instruction of generating the initial code to the target home appliance. The preset condition includes a WIFI module of the target home appliance having been changed, or a circuit board of the target home appliance with the WIFI module installed having been changed, that is, when the circuit board is changed, the WIFI module is changed together. The initial codes for communicating with the control terminal in the WIFI modules are different, so that after the WIFI module of the target home appliance is changed, the initial code stored by the control terminal is different from the initial code of the new WIFI module, and the initial code stored in the control terminal needs to be updated according to the initial code generated by the new WIFI module.

After the WIFI module is changed, the target home appliance can start an AP function, that is, the hotspot function information broadcasting, and the broadcast information can include the device identifier of the target home appliance and the device identifier of the new WIFI module. If the network configuration terminal receives the broadcast information, the device identifier of the target home appliance and the device identifier of the WIFI module can be obtained by the network configuration terminal. The network configuration terminal may store a device identifier of the target home appliance and a device identifier of the WIFI module associated with the device identifier of the target home appliance. If the device identifier of the WIFI module associated with the stored device identifier of the target home appliance is different from the device identifier of the WIFI module of the information, it can determine that the WIFI module or the circuit board containing the WIFI module of the target home appliance is changed, at this moment, the network configuration terminal can determine that the target home appliance meets the preset condition.

In the technical solution provided by this embodiment, when the network configuration terminal detects that the target home appliance meets a preset condition, the network configuration terminal determines that the control terminal cannot communicate with the target home appliance, the network configuration terminal can automatically send the generation instruction of generating the initial code to the target home appliance, and a degree of intelligence of the network configuration terminal is high.

Figure 4:
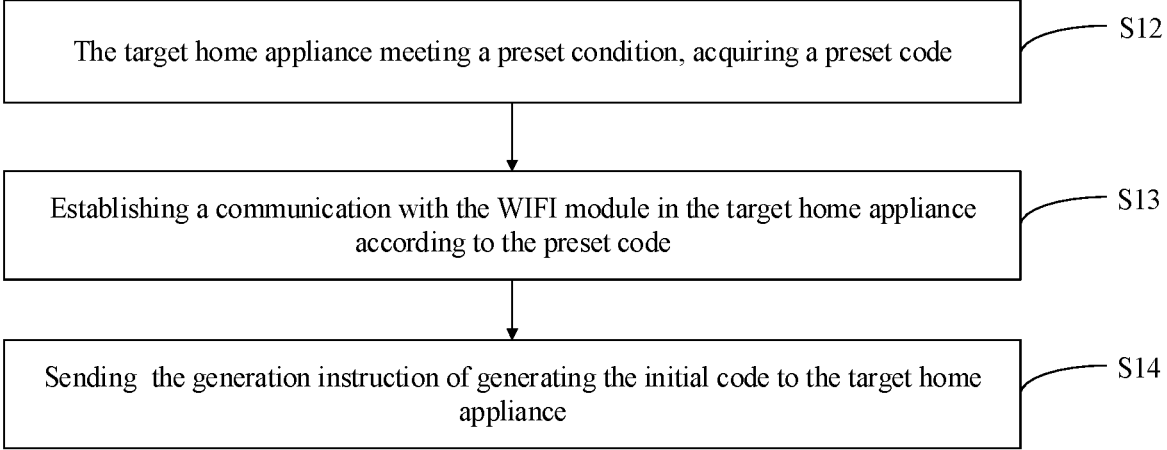
FIG. 4 is a detailed flowchart of operation S10 according to a third embodiment of the network configuration method for the home appliance of the present application.

Referring to FIG. 4, FIG. 4 is a third embodiment of the network configuration method for the home appliance according to the present application. Based on the first or second embodiment, operation S10 includes:

operation S12, the target home appliance meeting the preset condition, and acquiring a preset code;

operation S13, establishing a communication with the WIFI module of the target home appliance according to the preset code;

operation S14, sending the generation instruction of generating the initial code to the target home appliance.

In this embodiment, after the target home appliance changes the WIFI module, the WIFI module is disconnected from the network configuration terminal. The WIFI module is provided with a communication protocol for communicating with the network configuration terminal, and the network configuration terminal is only used for establishing communication between the WIFI module and the control terminal, thus a code for communication between the network configuration terminal and the WIFI module can be set for the communication protocol, and stored in the network configuration terminal, which is the preset code. The preset code can be a relatively simple and universal code, for example, 123456, so that the network configuration terminal can communicate with the WIFI module of each home appliance according to the preset code.

The network configuration terminal acquires the preset code when it detects that the target home appliance meets the preset condition, so that the communication between the network configuration terminal and the WIFI module of the target home appliance is established according to the preset code, and the network configuration terminal sends the generation instruction of generating the initial code to the target home appliance.

In the technical solution provided by this embodiment, when the target home appliance meets a preset condition, the network configuration terminal acquires a preset code and establishes communication with the WIFI module of the target home appliance according to the preset code, so that the network configuration terminal can obtain the initial code from the new WIFI module for the control terminal to establish communication with the WIFI module.

In order to achieve the above purpose, the present application further provides a network configuration terminal.

The network configuration terminal includes a memory, a processor, and a network configuration program for a home appliance stored in the memory and executable by the processor. When the network configuration program for the home appliance is executed by the processor, the operations of the network configuration method for the home appliance as described in the above mentioned embodiments are implemented.

In order to achieve the above purpose, the present application further provides a computer-readable storage medium, the computer-readable storage medium stores a network configuration program for a home appliance, when the network configuration program for the home appliance is executed by a processor, the operations of the network configuration method for the home appliance as described in the above mentioned embodiments are implemented.

The serial numbers of the embodiments of the present application are only for description, and do not represent the superiority or inferior of the embodiments.

It should be noted that the terms "comprising," "including" or any other variation thereof herein are intended to cover a non-exclusive inclusion, such that a process, method, article, or system that includes a series of elements not only includes those elements, but also includes other elements not expressly listed, or an element inherent to such a process, method, article, or system. In the absence of more restrictions, an element defined by the phrase "comprising one . . . " does not exclude the presence of additional identical elements in the process, method, article, or system that includes the element.

Through the description of the above embodiments, a person skilled in the art can clearly understand that the method can be implemented by means of software plus a necessary universal hardware platform, of course, can also be implemented by hardware, but in many cases, the former is preferred. Based on such an understanding, the technical solution of the present application essentially or the part giving a contribution to the prior art may be embodied in the form of a software product, and the computer software product is stored in a storage medium (such as a ROM/ RAM, a magnetic disk, or an optical disk) as described above, and includes several instructions for enabling a terminal (which may be a mobile phone, a computer, a server, an air conditioner, or a network air conditioner, or the like) to execute the method according to various embodiments of the present application.

The above are only preferred embodiments of the present application, and are not therefore intended to limit the scope of the present application. Any equivalent structure or equivalent process transformation made using the description and drawings of the present application, or any direct or indirect application to other related technical fields, is included in the claimed scope of the present application.

What is claimed is:

1. A home appliance network configuration method comprising:

determining, by a network configuration terminal, whether a target home appliance meets a preset condition, including:

in response to a WIFI module of the target home appliance having been changed, or a circuit board of the target home appliance which contains the WIFI module having been changed, determining that the target home appliance meets the preset condition;

in response to determining that the target home appliance meets the preset condition, sending, by the network configuration terminal, a generation instruction of generating an initial code to the target home appliance;

acquiring, based on the generation instruction, the initial code generated by the target home appliance through a first application program, for a control terminal to communicate with the WIFI module of the target home appliance based on the initial code, the network configuration terminal being provided with the first application program and a second application program, the first application program being a network configuration program, and the second application program being a control program; and causing, by the network configuration terminal, the second application program to send a control instruction to the target home appliance based on the initial code;

wherein the first application program obtains the initial code generated by the WIFI module through a first communication protocol, and the second application program sends the control instruction to the target home appliance through a second communication protocol.

2. The method according to claim 1, further comprising, after determining that the target home appliance meets the preset condition and before sending the generation instruction to the target home appliance:

acquiring a preset code; and establishing communication with the WIFI module of the target home appliance according to the preset code.

3. A network configuration terminal comprising:

a memory storing a home appliance network configuration program; and a processor configured to execute the program to:

determine whether a target home appliance meets a preset condition, including:

in response to a WIFI module of the target home appliance having been changed, or a circuit board of the target home appliance which contains the WIFI module having been changed, determining that the target home appliance meets the preset condition;

in response to determining that the target home appliance meets the preset condition, send a generation instruction of generating an initial code to the target home appliance;

acquire, based on the generation instruction, the initial code generated by the target home appliance through a first application program, for a control terminal to communicate with the WIFI module of the target home appliance based on the initial code, the network configuration terminal being provided with the first application program and a second application program, the first application program being a network configuration program, and the second application program being a control program; and cause the second application program to send a control instruction to the target home appliance based on the initial code;

wherein the first application program obtains the initial code generated by the WIFI module through a first communication protocol, and the second application program sends the control instruction to the target home appliance through a second communication protocol.

4. The network configuration terminal according to claim 3, wherein the processor is further configured to execute the program to, after determining that the target home appliance meets the preset condition and before sending the generation instruction to the target home appliance:

acquire a preset code; and establish communication with the WIFI module of the target home appliance according to the preset code.

5. A non-transitory computer-readable storage medium storing a home appliance network configuration program that, when executed by a processor, causes the processor to:

determine whether a target home appliance meets a preset condition, including:

in response to a WIFI module of the target home appliance having been changed, or a circuit board of the target home appliance which contains the WIFI module having been changed, determining that the target home appliance meets the preset condition;

in response to determining that the target home appliance meets the preset condition, send a generation instruction of generating an initial code to the target home appliance; and acquire, based on the generation instruction, the initial code generated by the target home appliance through a first application program, for a control terminal to communicate with the WIFI module of the target home appliance based on the initial code, the network configuration terminal being provided with the first application program and a second application program, the first application program being a network configuration program, and the second application program being a control program; and cause the second application program to send a control instruction to the target home appliance based on the initial code;

wherein the first application program obtains the initial code generated by the WIFI module through a first communication protocol, and the second application program sends the control instruction to the target home appliance through a second communication protocol.

6. The non-transitory computer-readable storage medium according to claim 5, wherein the program further causes the processor to, after determining that the target home appliance meets the preset condition and before sending the generation instruction to the target home appliance:

acquire a preset code; and establish communication with the WIFI module of the target home appliance according to the preset code.

* * * * *